US008323383B2

United States Patent

Evans et al.

(10) Patent No.: US 8,323,383 B2

(45) Date of Patent: Dec. 4, 2012

(54) CYCLONE WITH CLASSIFIER INLET AND SMALL PARTICLE BY-PASS

(75) Inventors: Peter Evans, Darlington (GB); William Barry Featherstone, Guisborough (GB)

(73) Assignee: Siemens Vai Metals Technologies Ltd., Christchurch, Dorset (GB)

(*) Notice: Subject to any disclaimer, the term of this patent is extended or adjusted under 35 U.S.C. 154(b) by 510 days.

(21) Appl. No.: 12/525,738

(22) PCT Filed: Feb. 13, 2008

(86) PCT No.: PCT/GB2008/050093

§ 371 (c)(1), (2), (4) Date: Dec. 23, 2009

(87) PCT Pub. No.: WO2008/099214

PCT Pub. Date: Aug. 21, 2008

(65) Prior Publication Data

US 2010/0147149 A1 Jun. 17, 2010

(30) Foreign Application Priority Data

Feb. 16, 2007 (GB) .................................. 0703051.3

(51) Int. Cl.
*B01D 45/12* (2006.01)

(52) U.S. Cl. ................ 95/271; 95/269; 95/267; 55/337; 55/392; 55/459.1; 55/459.2; 55/459.3; 55/410; 55/417; 55/420; 209/44.1; 209/143; 209/714; 209/170

(58) Field of Classification Search .................... 55/337, 55/392, 459.1–459.3, 459.5, 410, 417, 420; 95/271, 269; 209/143, 44.1, 714, 170; 210/170.3
See application file for complete search history.

(56) References Cited

U.S. PATENT DOCUMENTS

| | | | | |
|---|---|---|---|---|
| 3,090,746 | A * | 5/1963 | Markert et al. | 208/48 R |
| 3,865,242 | A | 2/1975 | Musto | |
| 3,883,332 | A | 5/1975 | Llewelyn et al. | |
| 4,094,772 | A | 6/1978 | Hillekamp et al. | |
| 4,397,741 | A | 8/1983 | Miller | |
| 4,776,950 | A | 10/1988 | Green et al. | |
| 4,872,972 | A | 10/1989 | Wakabayashi et al. | |
| 5,771,844 | A * | 6/1998 | Dietz | 122/4 D |
| 6,129,775 | A | 10/2000 | Conrad et al. | |
| 6,193,075 | B1 * | 2/2001 | Plas | 209/715 |
| 2007/0012608 | A1 | 1/2007 | Su et al. | |

FOREIGN PATENT DOCUMENTS

| | | | |
|---|---|---|---|
| GB | 2 136 326 | | 9/1984 |
| GB | 2 136 326 | A | 9/1984 |
| JP | 2001224983 | A | 8/2001 |
| RU | 2 118 374 | C1 | 8/1998 |
| RU | 2 255 116 | C2 | 1/2005 |
| SU | 994019 | | 7/1979 |
| SU | 1613177 | A1 | 12/1990 |
| WO | WO 03/089148 | | 10/2003 |

* cited by examiner

*Primary Examiner* — Jason M Greene
*Assistant Examiner* — Dung H Bui
(74) *Attorney, Agent, or Firm* — Schiff Hardin LLP

(57) ABSTRACT

In a cyclone and a method for operating a cyclone, in a duct leading to an inlet of the cyclone, at least partial separation of particles according to size takes place. A bypass arrangement diverts selected particles to the discharge duct of the cyclone. The cyclone is suitable for separating particles from blast furnace waste gases.

9 Claims, 3 Drawing Sheets

CYCLONE WITH CLASSIFIER INLET AND SMALL PARTICLE BY-PASS

BACKGROUND OF THE INVENTION

1. Field of the Invention

The present invention concerns a cyclone of the type having a classifier for at least partially separating particles according to size.

2. Description of the Prior Art

Conventionally, the first stage of dust collection from blast furnace waste gas is a dustcatcher. This is no more than a large vessel with low gas velocities in which coarse dust particles are allowed to settle out. The second stage is a wet scrubber where small particles are removed. Because of its composition, the dust captured in the dustcatcher can be recycled back to the blast furnace. Dust captured in the wet system must be disposed of in other ways because it contains materials such as zinc that cannot be recycled.

Dustcatchers invariably do not achieve an ideal split and much recyclable material is passed to the wet system along with the contaminants. A higher efficiency dust removal system is required that maximizes the recycle of good material whilst passing on the contaminants to the wet system.

A conventional dry dust collector is the cyclone. Unfortunately, the efficiency of a cyclone tends to be high enough to collect too much of the zinc bearing material.

Designing a cyclone to achieve a reduced efficiency is not straightforward. Often the dirty gas inlet conditions are not known accurately or are likely to vary during operation. The necessary efficiency might be unknown and is likely to vary depending upon changes in dust particle size distribution. During test work it has been found that varying the geometry of the cyclone does not always produce expected changes in dust collection efficiency. The efficiency of a cyclone may be changed at the design stage by reducing the inlet velocity. The effect of this would be to increase the size of the cyclone which consequently increases costs. The result would be a cyclone whose performance remained subject to the vagaries of inlet gas conditions and dust loading and size analysis.

The dirty gas from a blast furnace is conventionally delivered to the first stage cleaning plant via a duct known as a downcomer that slopes steeply, often at an angle between 40 and 55 degrees depending upon site layout. The entry to the cyclone is in the horizontal plane and is rectangular in section. To turn the gas flow into the horizontal plane the designer might consider the use of internal guide vanes, typically in the rectangular section, to improve the flow distribution entering the cyclone.

SUMMARY OF THE INVENTION

The present invention is a cyclone with a classifier inlet and a small particle by-pass arrangement that allows the efficiency of the cyclone to be adjusted during furnace shut downs or during operation to optimize capture of recyclable material whilst passing on contaminants to the wet cleaning system.

The term 'classifier inlet' means an inlet across which particles are distributed according to their size. Typically, larger particles will be more heavily concentrated in the lower regions of the inlet.

A first embodiment of the invention employs an inlet bend without vanes that enters the cyclone tangentially and acts as a crude classifier, encouraging larger dust particles to accumulate in the lower part of the entry duct.

In another embodiment of the invention, the downcomer enters the cyclone directly, typically at right angles to a radius of the cylindrical region of the body and without a bend. The classifying effect is transferred to the top part of the cyclone body from where the smaller dust particles are removed via the bypass ducts.

A third embodiment takes advantage of the classifying effect of a dirty gas flow in a horizontal duct. This effect is not as strong as that shown by a bend or an angled entry, but it may still be used in a similar manner, having bypass ducts installed in the top of the cyclone body as described above.

In all embodiments the cyclone has a long outlet duct which extends into the interior of the cyclone body. The stability of this structure is assured by an extension of the bottom plate of the inlet duct.

Blast furnace top pressures currently tend to be up to 3 $bar_g$. The blast furnace design top pressure is the design pressure for the cyclone. It is better to contain these pressures within a conical or dished end structure rather than by a flat plate. The traditional top of a cyclone is a flat plate. Tests indicate that the top of the cyclone may be conical if desired, or another shape suitable for a pressure vessel, and this is another embodiment of the current invention. If desired the flat top may be retained, but it is economical to construct this flat plate inside the pressure envelope. In this embodiment provision is made for pressure equalization vents between the enclosed volume and the cyclone outlet duct.

In the event of access being necessary for maintenance, the cyclone in any of the above embodiments is provided with purge lines and purge vents so that blast furnace gas may be removed from the cyclone. In the embodiment with an enclosed volume between the flat plate and the pressure envelope, a purge line or lines are provided and the pressure equalizing vents act as purge vents.

DESCRIPTION OF THE PREFERRED EMBODIMENTS

Figure 1:
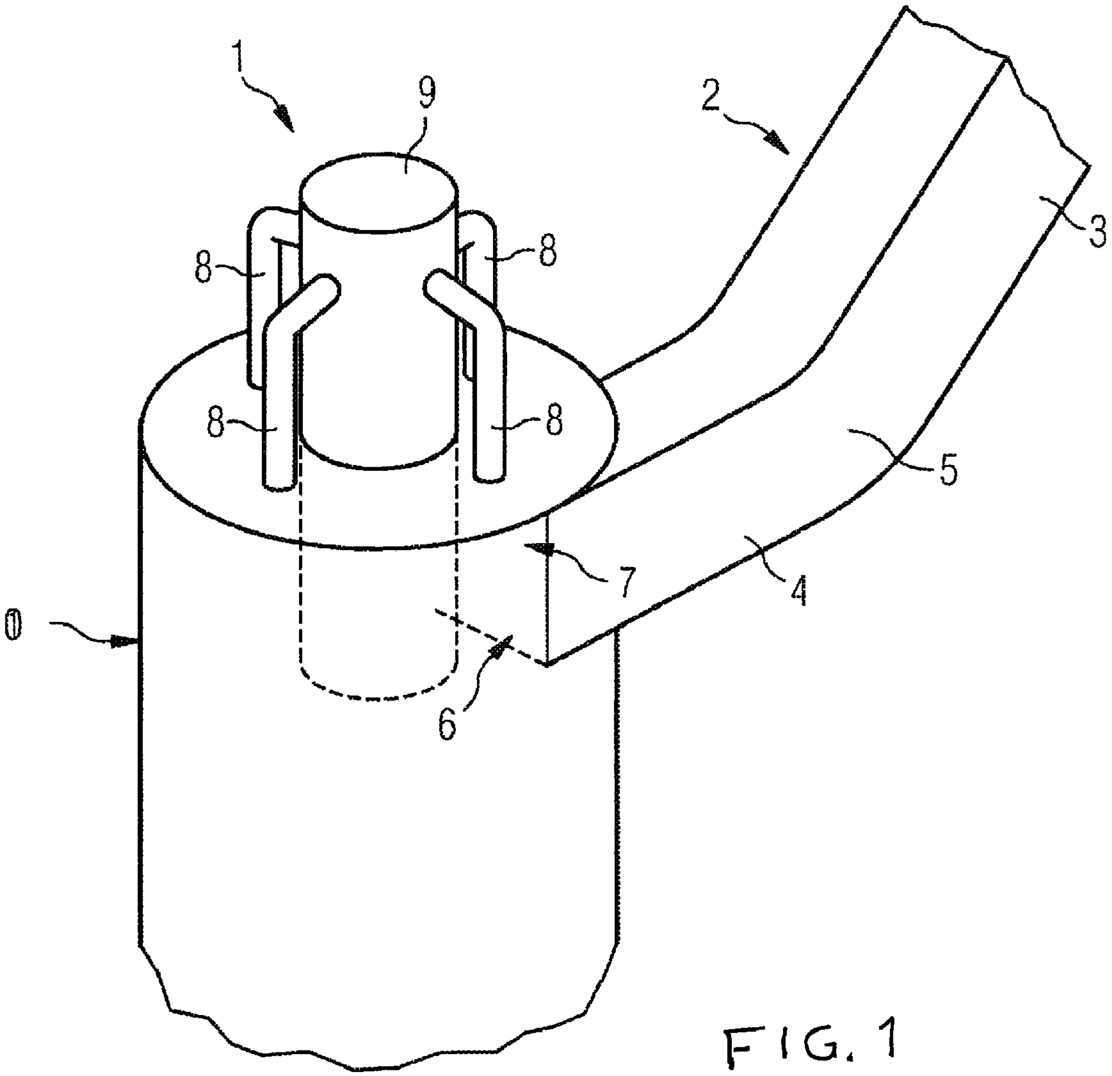
FIG. 1 is a perspective view of a first embodiment of a cyclone according to the present invention.

Referring to FIG. 1, a cyclone according to a first embodiment of the invention has a substantially cylindrical body 10 and further has an inlet duct 2 having a sloping region 3 and a region 4 which enters the body tangentially by virtue of bend 5.

The bend tends to slow particles down so that larger particles tend to move towards the bottom 6 of the inlet duct but smaller particles are less affected by the bend and remain largely evenly distributed. The larger dust particles are collected by the cyclone in the normal way. A proportion of the smaller particles near the top 7 of the inlet duct, which contain a high proportion of contaminant, are diverted from the upper end of the cyclone body 10, via a number of bypass ducts 8, and into the cyclone discharge duct 9. The number and size of the bypass ducts 8 depends upon how much of the gas stream is required to be diverted.

Figure 2:
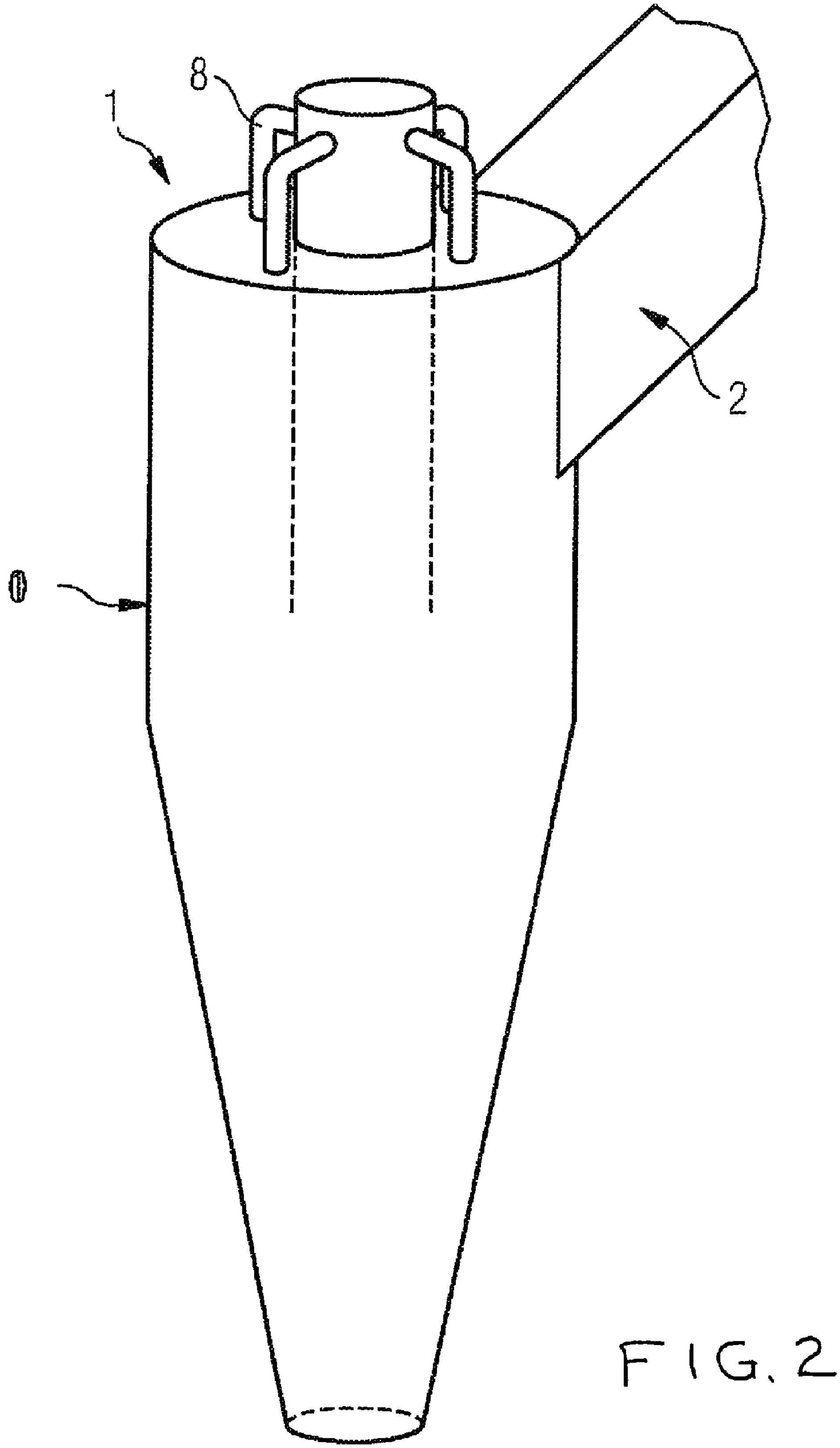
FIG. 2 is a perspective view of a second embodiment of a cyclone in accordance with the present invention.

Referring to FIG. 2, in a second embodiment, the inlet duct 2 is sloped and enters the cyclone 1 substantially at right angles to a radius of the cyclone. Again, a particle classifying effect means that smaller particles are preferentially diverted via bypass ducts 8 (only one labeled for clarity).

Figure 3:
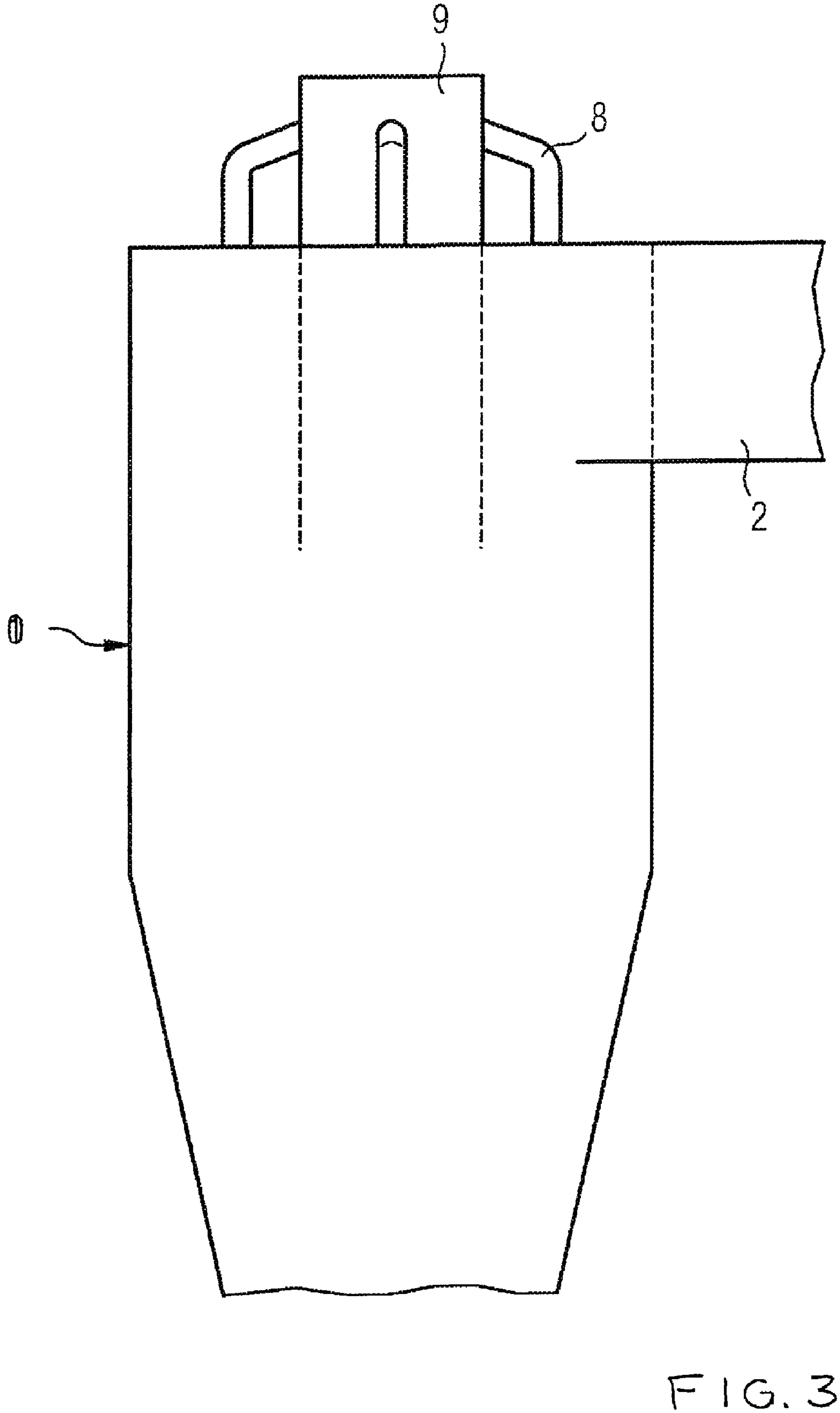
FIG. 3 is a perspective view of a third embodiment of a cyclone in accordance with the present invention.

In the embodiment shown in FIG. 3, the inlet duct 2 is horizontal. Even in this simple arrangement, a classifying effect means that smaller particles are preferentially diverted via bypass ducts 8 to the discharge duct 9.

In each of the embodiments shown, the bypass ducts are provided with means for individual isolation (not shown), positioned so as to be accessible. This isolation means may be a valve, such as a sliding plate valve, or a blanking plate. A suitable valve may be operated when required. A blanking plate may be inserted or removed during a furnace shutdown. The decision whether to open or close a bypass pipe is made on the evidence derived from measurements of zinc composition of collected cyclone dust.

The cyclone structure and the upper part of the cyclone are designed to support the lower end of the inlet duct 2 so that additional supports are unnecessary.

Although modifications and changes may be suggested by those skilled in the art, it is the intention of the inventors to embody within the patent warranted heron all changes and modifications as reasonably and properly come within the scope of their contribution to the art.

The invention claimed is:

1. A cyclone comprising:

a cyclone body having a cylindrical region;

a classifier inlet duct to said cyclone body configured to at least partially separate particles according to size that proceed through said classifier inlet duct into said cyclone body;

a discharge duct from said cyclone body through which particles are discharged from said cyclone body; and at least one bypass duct configured to divert smaller particles separated by the classifier inlet duct to the discharge duct.

2. A cyclone as claimed in claim 1 wherein said inlet duct comprises a sloping region, a bend, and a region that enters the body tangentially to the cylindrical region.

3. A cyclone as claimed in claim 1 wherein the inlet duct comprises a sloping region, a bend, and a region that enters the body substantially at a right angle to the cylindrical region.

4. A cyclone as claimed in claim 1 wherein the inlet duct enters the body horizontally.

5. A cyclone as claimed in claim 1 wherein each bypass duct comprises an isolator that isolates a bypass duct associated therewith from said discharge duct to selectively vary an amount of said smaller particles that is diverted to the discharge duct.

6. A cyclone as claimed in claim 1 wherein said classifier inlet duct is configured to receive waste gas from a blast furnace.

7. A method for treating waste gas from a blast furnace, comprising the steps of:

directing waste gas from a blast furnace to an inlet of a cyclone via a duct, said waste gas containing particles having a variety of different sizes;

in said duct, at: least partially separating particles into regions of the inlet according to particle size;

diverting gas from a region of the inlet having a preponderance of smaller particles to a discharge duct of the cyclone;

separating a remainder of particles entrained in the waste gas from the waste gas in the cyclone; and directing said remainder of particles separated from the waste gas by the cyclone back to the blast furnace.

8. A method as claimed in claim 7 comprising: directing said waste gas to said cyclone inlet via a duct having a bend and, in said bend, providing enhanced separation of said particles into said regions of the inlet according to particle size.

9. A method as claimed in claim 7 wherein the step of diverting gas from a region of the inlet having a preponderance of smaller particles to a discharge duct of the cyclone comprises selectively diverting an adjustable amount of said gas from said region of said inlet having said preponderance of smaller particles to said discharge duct of the cyclone.

* * * * *